(12) United States Patent
Labreche et al.

(10) Patent No.: US 7,734,436 B2
(45) Date of Patent: Jun. 8, 2010

(54) COMPARATIVE ANALYSIS OF A SAMPLE RELATIVE TO A DATABASE

(75) Inventors: Saïd Labreche, Buzet sur Tarn (FR); Hicham Amine, Dieupentale (FR); François Loubet, Gardouch (FR); Eric Chanie, Deyme (FR); Jean-Christophe Mifsud, Toulouse (FR)

(73) Assignee: Alpha M.O.S., Toulouse (FR)

( * ) Notice: Subject to any disclaimer, the term of this patent is extended or adjusted under 35 U.S.C. 154(b) by 402 days.

(21) Appl. No.: 11/786,455

(22) Filed: Apr. 11, 2007

(65) Prior Publication Data

US 2008/0046195 A1 Feb. 21, 2008

(30) Foreign Application Priority Data

Apr. 12, 2006 (EP) .................................. 06290598

(51) Int. Cl.
*G01N 37/00* (2006.01)
(52) U.S. Cl. ........................................................ 702/81
(58) Field of Classification Search .................... 702/81, 702/189
See application file for complete search history.

(56) References Cited

U.S. PATENT DOCUMENTS 5,046,846 A * 9/1991 Ray et al. .................... 356/326
6,311,134 B1 * 10/2001 Sorenson ....................... 702/22

FOREIGN PATENT DOCUMENTS

EP 1 336 844 8/2003
EP 1 566 633 8/2005

OTHER PUBLICATIONS

Monev, V: "Introduction to Similarity Searching in Chemistry" Match-Communications in Mathematical and in Computer Chemistry, vol. 51, 2004, pp. 7-38, *ongoing revision of Jan. 29, 2005*.
Mayfield, H.T.: "Application of Chemometrics to the Classification of Orange Essence Oil Varieties by GLC", Journal of High Resolution Chromatography & Chromatography Communications, vol. 9, No. 2, Feb. 1986, pp. 78-83.
Gardner, J.W., et al: "Application of an Electronic Nose to the Discrimination of Coffees," Sensors and Actuators B, Elsevier Sequoia S.A., Lausanne, CH, vol. 6, 1992, pp. 71-75.

* cited by examiner

*Primary Examiner*—Drew A Dunn
*Assistant Examiner*—Stephen J Cherry
(74) *Attorney, Agent, or Firm*—Weingarten, Schurgin, Gagnebin & Lebovici LLP

(57) ABSTRACT

The comparative analysis of a sample, derived from a product, with respect to a database comprises the step of determining the class membership of the different characteristics (variables) describing the samples: whether they are characteristics common to the sample under test and the database, they are characteristics particular to the sample under test, or they are characteristics particular to the database. The assignment of the variables to these classes enables parameters to be defined for global comparison of the sample under test and the database, based on: ratios summarizing the values taken by the variables of the different classes, or the distribution of the variables of the different classes. A machine implementation of the analysis is described.

20 Claims, 10 Drawing Sheets

COMPARATIVE ANALYSIS OF A SAMPLE RELATIVE TO A DATABASE

This application claims priority to European application No. 06 290598.9 filed Apr. 12, 2006.

The present invention relates to the analytical techniques that are used for the comparative analysis of samples, notably for the comparison of a sample with respect to a database, in the field of quality assurance and the like.

It is often desired to check that the quality of a product (in terms of smell, taste, composition, or other properties) reaches a predetermined level, or it is desired to predict the value of a particular property of a product, for example the concentration of a particular substance within the product. This is more critical in the case of an edible product. Various instrument-based or sense-based analytical techniques have been proposed for taking measurements on samples of products and for comparing these measurements with others taken on reference samples (for which the quality, the concentration of components, etc., are known beforehand).

Typically, this type of process includes a so-called "training" stage during which measurements are taken on reference samples in order to establish a data processing model that enables the variables (measurements) associated with the interesting properties of the product to be highlighted. Conventional data processing models that are developed during this training phase include, among others, mathematical methods, statistical methods, neural networks (whose weights evolve during the training phase), decision rules (these rules being determined during the training phase), amongst others.

These data processing models are often used in order to determine the class to which a so-called "unknown" sample belongs, when that unknown sample is presented to the system after the training phase. Because of this, this type of model is often called an "identification model" or a "recognition model". In general, the analysis seeks to classify the "unknown" sample into one of the classes that are defined in respect to the training database, which can be a class associated with different origins of products—for example the classes "Colombian coffee", "Jamaican coffee", "Ethiopian coffee", etc. when an attempt is being made to discover the type of a coffee sample—or can be classes representing different levels of quality—for example, the classes "deficient", "borderline", "good quality", etc.

The skilled person will understand that the expressions "an unknown sample" or a sample "being tested" cover a sample whose nature is not known as well as a sample whose nature is known (for example "it is a sample of coffee") but whose quality, or percentage composition in terms of a particular component, is not known.

In general, the identification or recognition models developed during the training phase are updated by addition to them of data coming from appropriate "unknown" samples which have been presented to the system. The decision to perform such updating can be taken manually (by a user) but it can also be taken automatically. The latter case is governed by a decision rule of the type "if the degree of similarity between the unknown sample and the training (reference) samples is greater than a selected threshold level then this unknown sample can become a training sample." It should be noted that, at each update, the models constructed based on the training samples are updated.

Often these analytical methods seek to detect defects affecting a product, for example a product coming off a production line. Therefore, it is important that these techniques can differentiate between natural variations in a product and true defects.

The measurements that an instrument takes on a sample constitute a corresponding number of variables whose values describe this sample. Many of the instruments that are used to take measurements on samples produce a constant number of variables. For example, an "electronic nose" type apparatus includes a certain number of sensors and, for each sample, the signals output by these sensors constitute the measured variables. Because the number of sensors remains fixed, this measurement apparatus generates the same number of variables for the unknown samples and for the reference samples used during the training phase.

Now, for several analytical instruments (and sense-based techniques) the number of variables generated in respect of samples is not fixed. For example, the analytical technique of gas-phase chromatography involves passing a gas sample through a column and detecting the different components that come out of the column after respective different retention times. In fact, the results of the analysis correspond to a certain number of peaks of different heights each corresponding to a different retention time (that is, time of retention within the column). The number of peaks (retention times) is different depending on the chemical composition of the sample.

It is not clear how to compare an unknown sample with a database in the case where a non-constant number of variables can describe each sample. More particularly, it is not straightforward to know how to develop and adapt an identification model in the case where the variables describing the unknown samples are not necessarily the same as the variables describing the reference samples.

In the past, it has been proposed to address this problem by limiting the comparison that is made between the unknown sample and the reference samples to the variables which these samples have in common. However, if the data processing model only processes the variables that are common to the unknown sample and the training database (i.e. the set of reference samples) then the user will have a less precise understanding of the similarity or difference between the unknown sample and the training database. More especially, there is a significant risk that samples possessing defects will go undetected or that there will be confusion between natural variations in a product (which should be incorporated into the recognition model) and actual defects.

The analytical systems described above often include a graphical interface for displaying a certain amount of data and results to the user. The results that are shown to the user enable him to have a rapid overview of the differences and similarities that there are between the sample undergoing test and the training database. The conventional graphical representations include representations which enable the measurements obtained for the unknown sample to be compared with the measurements obtained for the samples in the training database.

For example, according to one conventional graphical representation, a space is defined whose axes correspond to the different measurements taken on the samples and, in this space, respective points or vectors are displayed corresponding to the unknown sample and to the samples of the training database—see the example illustrated in FIG. 1. Additionally, or alternatively, in this space regions can be displayed which correspond to classes identified based on the reference samples. Usually, the axes are associated with particular combinations of variables rather than with individual variables because, in the case where the number of variables is greater than 3, if it were desired to represent them all individually, the depiction would be impossible. Generally, these representations are produced as a result of statistical methods for exploring data (e.g. Principal Components Analysis)

This type of graphical representation is not well-adapted to the case where the properties of the unknown samples have been measured in terms of variables which are non-identical to the variables that have been evaluated for the training database. The measurements taken for the unknown sample can be represented in this space to the extent that the unknown sample and the training database have some variables in common.

If the unknown sample is described using some of the variables which also describe the training database then it is possible to compare the unknown sample with respect to the training database in a Euclidian space defined by axes corresponding to these common variables (or corresponding to a sub-set of these common variables). However, using such a representation the similarities and differences between the unknown sample and the training database will be assessed on the basis of incomplete information. In fact, some information inherent in the data relating to the sample that is undergoing test and in the data relating to the reference samples is being ignored.

According to another conventional graphical representation, the values measured for the whole set of samples (those relating to the unknown sample and those relating to the samples of the training database) are superimposed. FIG. 2 illustrates an example of a graphical representation of this type, relating to an analysis by gas-phase chromatography—this analysis involved a training phase during which 7 samples were analysed, giving rise to 60 different variables (retention times). FIG. 2 shows the peaks obtained for these training samples. An unknown sample was then presented to the chromatography column and 51 retention times (variables) were measured. FIG. 2 also shows the peaks obtained for the unknown sample.

Looking at FIG. 2, it is clear that this graphical representation includes all of the information that is available relating to the unknown sample and the reference samples. However, the quantity of information that is presented, and the overlapping of the different traces, does not allow the differences and the similarities between the unknown sample and the database to be demonstrated in a simple manner.

The present invention has been made in view of the above-mentioned disadvantages.

The present invention relates to a method of comparative analysis of a sample, coming from a product, with respect to a database, as specified in the annexed claims.

The present invention further relates to a comparative analysis system as specified in the annexed claims.

Furthermore, the present invention relates to a method of producing a graphical representation, or a plurality of graphical representations, as described below.

Still further, the invention relates to a system for producing a graphical representation, or a plurality of graphical representations, as described below.

Yet further, the present invention relates to a graphical interface as described below.

Still further, the present invention relates to a set of graphical representations, as described below with reference to the first to fourth embodiments of the invention, which enable an assessment to be made of the differences and similarities between an unknown sample and a training database.

The methods and systems according to the present invention enable a sample to be compared with a database even in a case where the variables which describe the unknown sample are not the same as the variables which describe the reference samples of the database. The similarities and differences between the sample undergoing test and the reference samples are easier to notice according to these methods and systems.

The above and other advantages and features will become clearer from the following description of certain embodiments of the invention, given by way of example and not limitation, and illustrated with reference to the annexed drawings, in which.

Figure 1:
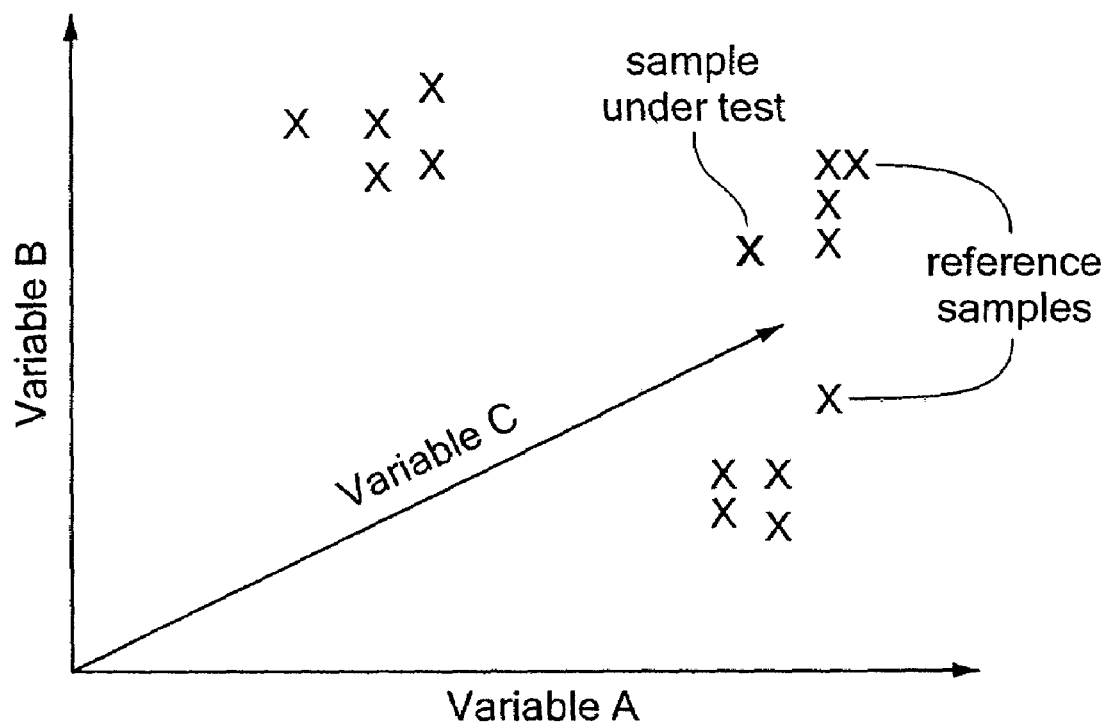
FIG. 1 is a conventional graphical representation showing a multi-dimensional space defined according to particular measurement variables, and sample data represented in this space.
Figure 2:
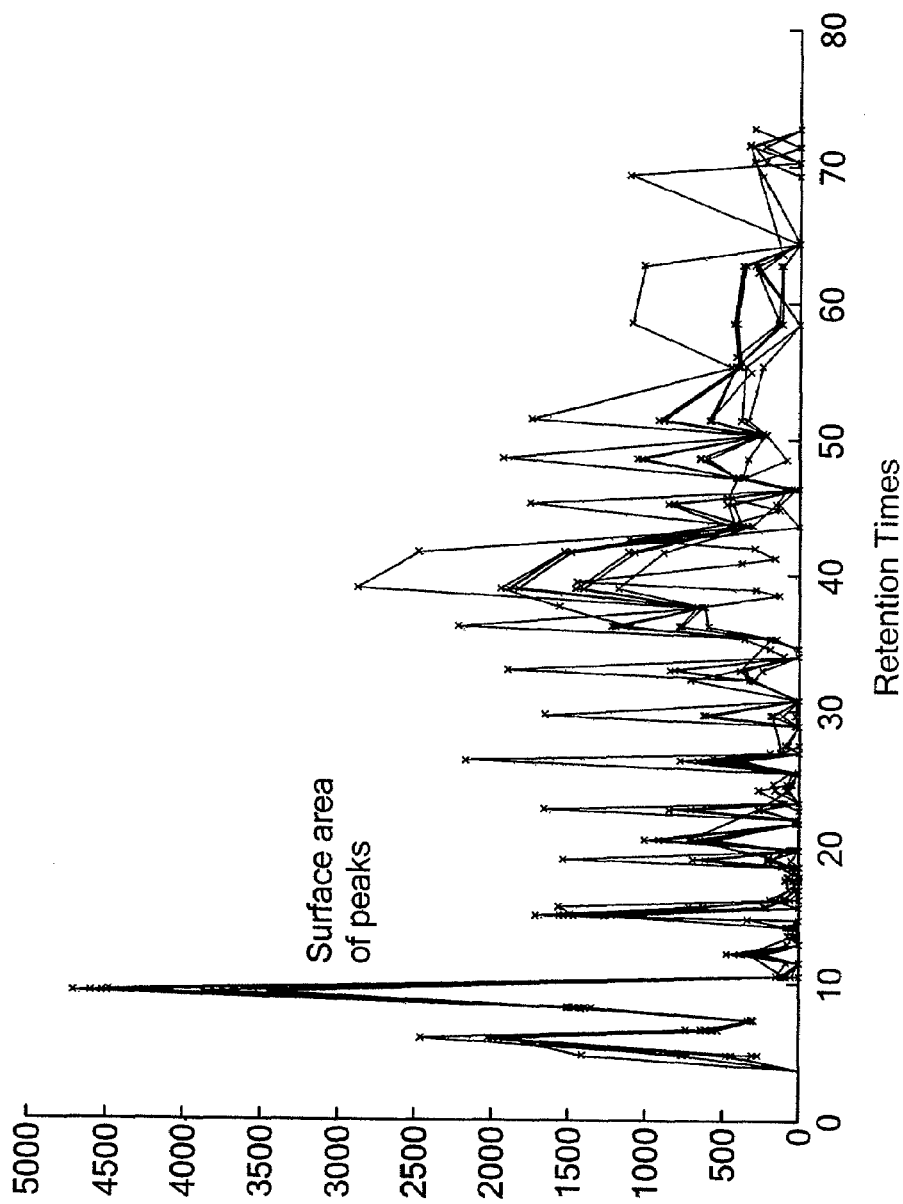
FIG. 2 is a graph of conventional type showing the surface areas of the peaks measured during a process of analysis of a first set of samples by gas-phase chromatography.

The following description of different embodiments of the present invention will describe methods of comparative analysis relating to measurements produced by gas-phase chromatography. However, the invention is not limited with regard to the technique used for obtaining the measurements describing the sample—the skilled person will understand that there are several other instrument-based and sense-based analytical techniques (for example, analysis by infrared spectroscopy, analysis by sensory panel, and others) which produce a number of measurements that can vary from one sample to another and whose measurements can be processed by the methods according to the invention.

Furthermore, the following description mentions the analysis of a sample. It should be mentioned that the samples come from products and that the sample can take different forms: a small quantity of the product itself, a sample of volatile substances given off by the product (that is, a sample of the odour of the product), or other things.

Instrument-based and sense-based analytical techniques which describe samples using a non-fixed number of variables can produce, for a sample under test, values for variables that have no equivalent in the training database. In a similar way, it is possible that the sample under test may not produce a measurement relative to one or several of the variables which describe the samples of the training database. The present inventors realized that there is a loss of useful information if the comparative analysis of the sample relative to the training database only involves values of variables that are common to the sample under test and the samples of the training database. Also, they recognized that there can be analytical difficulties if all the calculations and all the displayed graphical representations relate to the full set of variables.

More particularly, the inventors have determined a manner of classifying the variables produced by the analytical technique, which enables a rapid comparison of the sample under test with the reference samples without loss of information or confusion due to an overly large quantity of information. According to this classification, not only the variables which are common to the sample under test and the training database but also the variables that are particular to the sample under test and those which are particular to the samples of the training database are identified.

Suppose that the training database includes data relating to a number n of reference samples $e_i$ (i=1 to n), the set of these samples can be designated by I. In other words:

$$I=\{e_i; i=1:n\}$$

If the samples of the training database are described by a number p of variables $V^j$ (j=1 to p), the set of these variables can be designated $J_a$. In other words:

$$J_a=\{V^j; j=1:\text{i p}\}$$

The training database is described by a table or matrix X of dimensions (n,p). The general term X(i,j) of this matrix is the value taken by the variable $V^j$ for the sample $e_i$. Thus, the matrix X is defined by:

$$X(i,j)=V^j(ei), \text{ with } i=1:n \text{ and } j=1:p$$

The database associated with the training samples is completely described by the three elements:

$$\{I, J_a, X\}$$

The unknown sample, which is designated $e_u$, is described by a set $J_u$ of q variables $Vu^k$. In other words:

$$Ju=\{Vu^k; k=1:q\}$$

A vector Xu of q dimensions is associated to the sample $e_u$. The generic term Xu(k) of this vector if the value taken by the variable $Vu^k$ for the sample $e_u$, that is:

$$Xu(k)=Vu^k(e_u), \text{ with } k=1:q$$

According to the present invention it is considered that the two sets of variables Ja and Ju form three classes and each measured value has associated to it an indication of the class to which it belongs.

Class 1: The Variables Common to the Sample Undergoing Test and to the Samples of the Training Database The set of common variables, that is the variables which are present in the two sets $J_a$ and $J_u$, is designated $J_{intersection}$.

$$J_{intersection}=\{V^j, V^j \in Ja \ \exists Vu^k \in Ju, \text{ such that } V^j=Vu^k\}$$

It should be noted that the so-called "common" variables are not necessarily common to all the reference samples; each of these variables is common to the sample under test and to at least one of the samples of the training database.

Class 2: The Variables Particular to the Training Samples (the Database)

The variables which are particular to the training samples are designated $Own(J_a)$ and they are constituted by the complement of the set $J_{intersection}$ in $J_a$; that is:

$$Own(J_a)=\{V^j, V^j \in Ja, \text{ for all } Vu^k \in Ju \text{ where } V^j \neq Vu^k\}$$

Class 3: The Variables Particular to the Unknown Sample

The variables which are particular to the sample under test are designated $Own(J_u)$ and they are constituted by the complement of the set $J_{intersection}$ in $J_u$; that is:

$$Own(J_u)=\{Vu^k, Vu^k \in Ju, \text{ for all } V^j \in Ja \text{ where } Vu^k \neq V^j\}$$

According to the present invention, when a comparative analysis is made of a sample with respect to a database, it is appropriate to classify the measurements taken on the sample under test and on the reference samples according to the one of the above-mentioned three classes to which the relevant parameter belongs. Data indicating the membership of the different parameters to the above-mentioned classes is recorded so as to be available to enable different types of comparison to be made of the sample under test, with respect to the database. Typically, this class-membership data is recorded in a temporary manner because, with respect to the variables describing the database, the classification will be different each time that a new "unknown sample" is introduced into the system.

Figure 3:
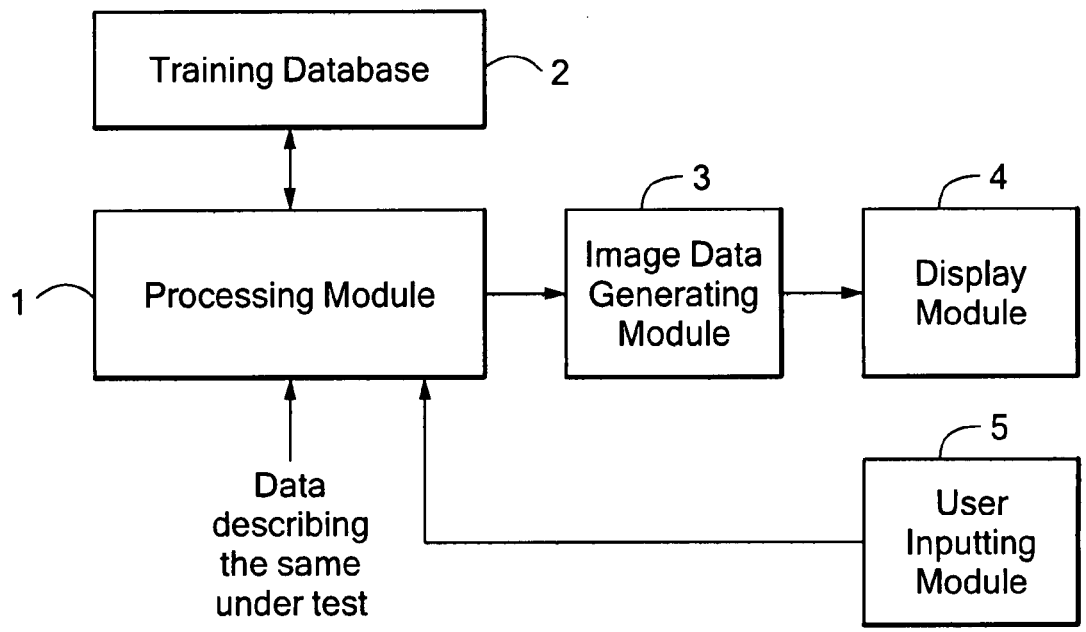
FIG. 3 is a diagram indicating in a general fashion the components of a system adapted to put into practice the method according to the first, second, third and fourth embodiments of the present invention.

FIG. 3 is a diagram indicating the main components of a comparative analysis system adapted to implement the methods of the present invention. The system includes a processing module 1 which receives input data describing an unknown sample that is to be analyzed. This data can come from a variety of different types of apparatus.

The comparative analysis of the unknown sample is made with respect to a training database made up of data relating to a certain number of reference samples. In general, the reference samples are samples whose nature or whose quality is known, or which possess a known value for a particular parameter (for example, the amount of a particular component), depending on the application of the system. Typically, the training database data is stored in a memory or other storage module 2; this storage module 2 can be local, or remote from the processing module 1. The processing module 1 communicates with the storage module 2 during the comparative analysis of the unknown sample, so as to read data relating to the measurements taken on the reference samples.

Usually, a single system (and the same system) is used for learning a data processing model (recognition model, or other model) during a preliminary training phase and for the comparative analysis of an unknown sample, with respect to the training database, during a subsequent phase. In such a case, the processing module 1 is arranged in a manner that enables it to develop a data processing model that is adapted to the particular application and, if need be, to update this model (see below).

The comparative analysis system according to the invention can allow a technician to intervene, for example so as to confirm a result produced by the processing module 1. Furthermore, in general it is appropriate to display the results of the analysis that is performed by the system. To achieve these purposes, the system can include an image data generating module 3, a display module 4, and an inputting module 5 useable by the technician for inputting data, commands or information. The image data generating module 3 can be constituted by, for example, a conventional module for generating data relating to a graphical user interface (GUI). The display module 4 can be a computer monitor or any other suitable display means. The inputting module 5 can include conventional input means such as a computer mouse, a keyboard, a touch screen, etc. Often the system 1 will be designed so that it is constituted by a computer programmed to implement the methods described below.

A description will now be given of methods, according to different embodiments of the present invention, in which a sample under test is compared to the reference samples according to certain global comparison parameters. A global comparison allows it to be determined which are the variables present or absent from the sets of characteristics which describe the reference samples and the unknown sample, or the relative "weight" of the variables in the sets and Ja and Ju.

According to a first embodiment of the present invention, the items used for the global comparison are based on a summary of the values taken by the different sets of variables for the training samples or the unknown sample.

For the unknown sample, a first parameter, M(I, I), is associated to the values taken (for the unknown sample) by the variables that are common to this unknown sample and to at least one of the reference samples, as follows:

$$M(I, I) = \text{Measure(Unknown, Intersection)} = \sum_{Vu^k \in J\text{intersection}} Vu^k(e_u)$$

For the unknown sample a second parameter M(I, P) is associated to the values taken (for the unknown sample) by the variables that are particular to the unknown sample, as follows:

$$M(I, P) = \text{Measure(Unknown, Own)} = \sum_{Vu^k \in \text{Own}(Ju)} Vu^k(e_u)$$

In order to summarize the reference samples of the training database, a first parameter M(A, I) is associated to the values taken, for the reference samples, by the variables that are common to these samples and to the unknown sample, as follows:

$$M(A, I) = \text{Measure(Training, Intersection)} = \sum_{V^j \in J\text{intersection}} \text{Maximum}\{V^j(e_i), i = 1:n\}$$

and a second parameter M(A,P) is associated to the values taken by the variables that are particular to the reference samples, as follows:

$$M(A, P) = \text{Measure(Training, Own)} = \sum_{V^j \in \text{Own}(Ja)} \text{Maximum}\{V^j(e_i), i = 1:n\}$$

The following four ratios are then defined:

$$R(I, I) = 100 \times \frac{M(I, I)}{\text{Measures}}, \quad R(I, P) = 100 \times \frac{M(I, P)}{\text{Measures}},$$

-continued $$R(A, I) = 100 \times \frac{M(A, I)}{\text{Measures}}, \quad R(A, P) = 100 \times \frac{M(A, P)}{\text{Measures}}$$

where

Measures=$M(I,I)+M(I,P)+M(A,I)+M(A,P)$

The global similarity or difference between the unknown sample and the training database can be evaluated based on these ratios.

Figure 4:
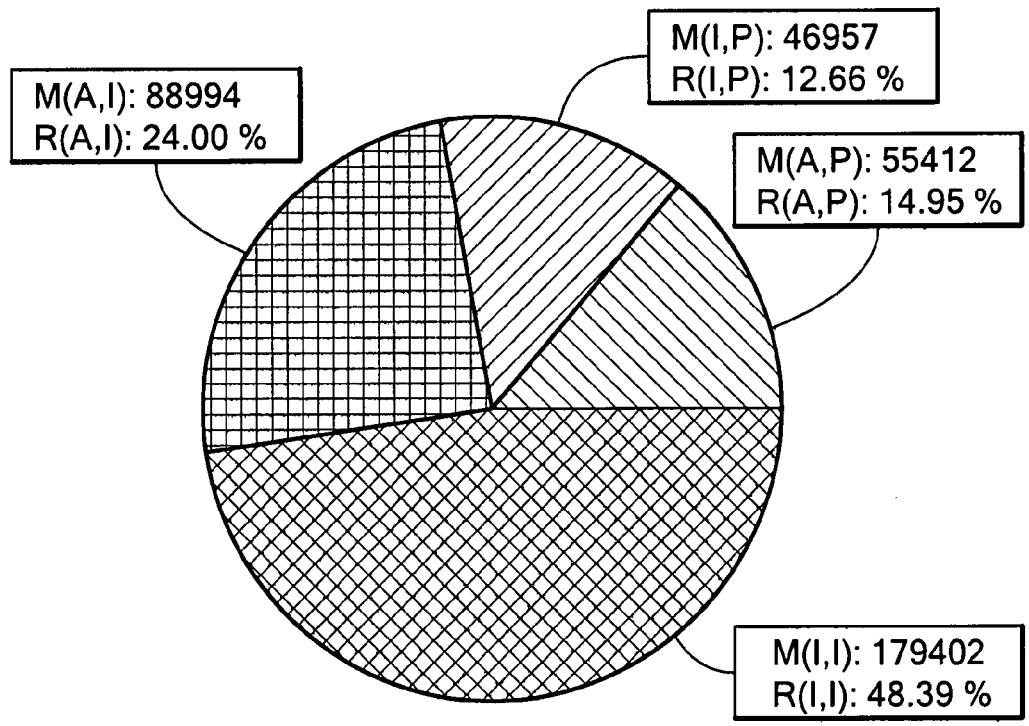
FIG. 4 is a pie-chart style diagram produced according to a first embodiment of the present invention, for making a global comparison of the sample undergoing test, relative to a training database.

This assessment can be made using a graphical representation of the ratios—see, for example, the representation shown in FIG. 4. In FIG. 4 the different ratios calculated according to the above-described method are represented in the form of sectors of a pie-chart, the respective areas of the sectors being determined dependent on the magnitude of the ratio in question. The first embodiment is not limited to this manner of representing the different ratios—in general the different ratios will be represented graphically using regions whose areas depend on the magnitude of the ratio in question.

In the graphical representation of FIG. 4, each region is represented using a different style of shading so as to provide the user with a rapid idea of the type of data that is represented in each region. However, this differentiation between the regions can be achieved using properties other than the style of shading the displayed regions: for example, the regions could be represented using different colors or different shades of gray, the regions could be filled using different patterns, etc. The use of different colors to represent the respective regions constitutes an approach that is particularly well-adapted to giving an intuitive understanding of the data's membership in the different classes.

The graphical representation shown in FIG. 4 is annotated so as to quantify the different parameters M(I,I), M(I,P), M(A,I) and M(A,P) as well as the corresponding ratios R(I,I), R(I,P), R(A,I) and R(A,P). However, it is not essential for the graphical representation to be provided with labels of this type; or it could be left to the user to make a choice as to whether or not the representation should be annotated and, if so, to select the additional information to be displayed (this being implemented by means of options provided in the user interface).

The ratios R(I,I), R(I,P), R(A,I) and R(A,P) can also be used for evaluating the global similarity or difference between the unknown sample and the training database with the aim of determining what is the origin of the differences. More particularly, these ratios can be used in order to determine whether the differences between the unknown sample and the samples of the training database are sufficiently pronounced to make it necessary for a decision to be made regarding the origin of these differences (a defect, or a natural variation in the product).

Different approaches are possible for working out whether the global difference between the sample under test and the training database is sufficiently large to be significant. According to one example, the method can be regulated such that the ratio R(I,P) is compared with a predetermined threshold level $\theta$ and, if R(I,P)>$\theta$, then it is considered that the difference between the sample under test and the training database is significant. A settable threshold level will be defined in the calculation protocol. When this threshold level is exceeded, alarms will be generated by the system. In certain cases, the mere presence of certain variables in Own($J_u$) is synonymous with a defect. In this case, the presence of this variable/these variables indicates a major difference (dangerous product) and an alarm will be generated.

Once a decision has been taken that the global difference between the sample under test and the training database is significant, it is appropriate either to signal a defect (in the case where the difference comes from a defect in the product), or to modify the data processing model used by the system (in the case where the difference comes from a natural variation in the product). Extra information is needed in order to detect this latter case. This information can be provided by the user of the system based on his knowledge of the evolution of his product, or it can be governed by a pre-programmed law or formula provided, for example, by some other source. In order to determine which of these two actions should be taken, a warning can be given to the user of the system informing him of the existence of a significant difference between the sample under test and the training database, and inviting him either to undertake the necessary action himself or to indicate to the system which of the two cases is involved.

The system can be adapted so as to react in an appropriate manner to the indications input by the user. For example, if the user inputs a signal indicating that the difference comes from a natural variation in the product, the system will respond to the introduction of this indication by making the necessary modification of the data processing model, notably by developing a modified version of the model according to processing which includes the sample under test amongst the reference samples used for developing the model.

There will now be described a second embodiment of the present invention according to which the sample under test and the reference samples are compared according to a second set of global comparison parameters. According to this second embodiment of the present invention, the global comparison elements are based on the calculation of cardinals of the three classes defined previously (that is, the numbers of members of these classes). Cardinal(Ja+Ju) designates the number of different variables defined for the set of training samples and the unknown sample to be compared, where Cardinal(Ja+Ju) is defined, as follows:

$$\text{Cardinal}(Ja \& Ju) = \text{Cardinal}(J\text{ intersection}) + \text{Cardinal}(\text{Own}(Ja)) + \text{Cardinal}(\text{Own}(Ju))$$

The following three ratios can then be defined $$\text{Ratio(intersection)} = 100 \times \frac{\text{Cardinal}(J\text{intersection})}{\text{Cardinal}(Ja \& Ju)}$$

$$\text{Ratio(Own}(Ju)) = 100 \times \frac{\text{Cardinal}(\text{Own}(Ju))}{\text{Cardinal}(Ja \& Ju)}$$

$$\text{Ratio(Own}(Ja)) = 100 \times \frac{\text{Cardinal}(\text{Own}(Ja))}{\text{Cardinal}(Ja \& Ju)}$$

These three ratios constitute a second set of parameters enabling a global comparison to be made of the unknown sample with respect to the training database. The global similarity or difference between the unknown sample and the training database can be evaluated based on these ratios.

Figure 5:
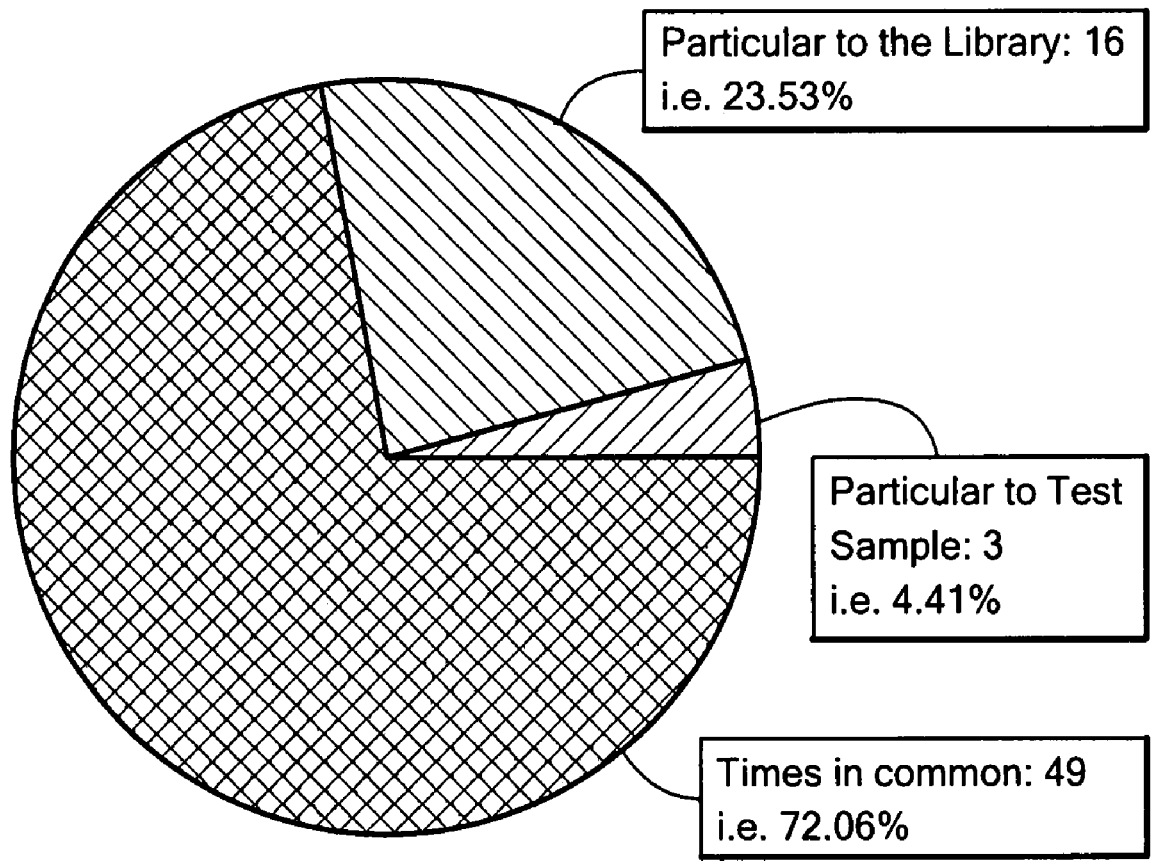
FIG. 5 is an example of a second pie-chart style diagram produced according to a second embodiment of the present invention for comparing making a global comparison of a sample relative to a training database.

This evaluation can be made using a graphical representation of these ratios—see, for example, the representation of FIG. 5. In FIG. 5, (as in FIG. 4) the different ratios are represented in the form of sectors in a pie-chart, the respective areas of these sectors being determined as a function of the magnitude of the ratio in question, and different shading styles being used to fill in the different regions. Once again, the present embodiment is not limited to this manner of representing the different ratios. Moreover, the representation of FIG. 5 can be annotated, if necessary.

The ratios Ratio(Intersection), Ratio(Own(Ju)), and Ratio(Own(Ja)) can also be used in order to assess the similarity or the difference between the unknown sample and the training database, both considered as a whole, with the aim of determining if the difference is significant and if this difference arises due to a defect or due to a natural variation in the product.

Various different approaches are possible for processing the ratios Ratio(Intersection), Ratio(Own(Ju)), and Ratio(Own(Ja)) so as to assess whether or not the overall difference between the unknown sample and the training database is significant. For example, one of these ratios can be compared with a respective predetermined threshold level and, if the ratio is greater than the corresponding threshold level, it can be decided that the overall difference between the unknown sample and the training database is significant. According to the application, the mere presence in an unknown sample of a particular variable (a variable associated with a risk) can be enough to trigger an alarm. In the same way, the mere absence of a variable (a variable associated with a quality that characterizes the product) can give rise to an alarm.

In the case where these is a significant difference between the unknown sample and the training database, the same measures can be adopted as those described above with reference to the first embodiment of the invention—notably, the user can be alerted to the existence of the significant difference and, if desired, different actions can be implemented based on indications input by the user. In particular, the indications input by the user can lead to the development of a new identification model (recognition model, or other model) by including the unknown sample amongst the reference samples that are used for development of the new model.

In several cases the variables used for describing the samples are related to one another and can be arranged in a particular order. For example, the measurements issuing from an analysis by gas-phase chromatography correspond to retention times in a column; the measurements can be arranged in order based on the duration of the different retention times. According to a third embodiment of the invention, the sample under test is compared to the reference samples by concentrating on the distribution of the measurement variables that belong to the different classes mentioned above. More particularly, according to the third embodiment of the invention, the order of the members of the set of variables Ja ∪ Ju is determined and next the localization (or the distribution) of the variables of each class, within the ordered set, is examined.

Figure 6A:
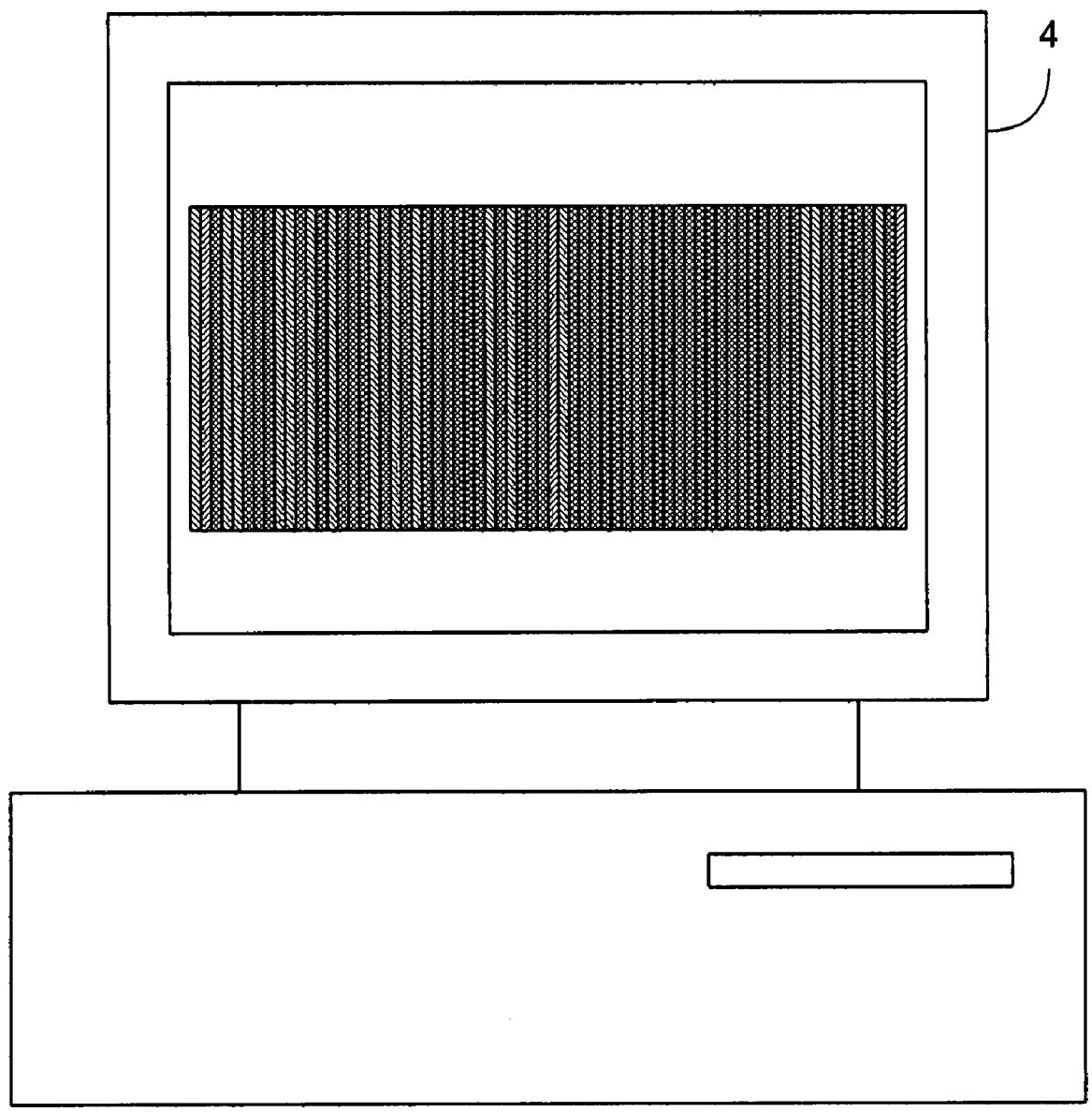
FIG. 6 shows two graphical representations, produced according to a third embodiment of the present invention, to illustrate an example of the partition of measurement variables into three classes.

This assessment can be made using a graphical representation of the ordered variables—see, for example, the representation of FIG. 6A. In FIG. 6A the variables of each class—the class of characteristics common to the unknown sample and the training database ($J_{intersection}$), the class of characteristics particular to the unknown sample (Own(Ju)), and the class of characteristics particular to the training database (Own(Ja))—are arranged in an order which corresponds to a hierarchy linked to the measurement technique. In the example of FIG. 6A, the variables correspond to retention times in a gas-phase chromatography column and they are arranged in increasing order of retention time.

In FIG. 6A, the variables of each class are represented using different styles of shading. However, similarly to the graphical representations used in the first and second embodiments, the differentiation between the three classes can be made in terms of a display parameter other than the style of shading that is used. Furthermore, in FIG. 6A no attention is paid to the measured values of each variable, all the variables are represented using a respective bar of fixed size. It should be noted that the shape of the region representing each variable can be varied without departing from the scope of the present embodiment.

The representation of FIG. 6A enables the user to understand rapidly what is the distribution of the variables of each class with respect to the retention times (or with respect to some other order that is inherent in the measurement variables and according to which the variables have been arranged in order). These distributions can also be examined using automated processing means.

The fact of having arranged the variables in a particular order, of having identified the variables' respective membership of the classes indicated above, and of having examined the distribution of the variables of each class within the ordered sequence that was established, enables particular configurations to be detected rapidly: such as, for example, the case where all of the variables that are particular to the unknown sample, or all of the variables that are particular to the training database, correspond to one extremity of the ordered sequence. According to the application, it can be considered that certain of the configurations are "abnormal" in the sense that they correspond to a significant global difference between the unknown sample and the training database. Typically, this difference will relate to certain key variables which should not appear (because they equate to appearance of a defect) or which definitely should appear (because the disappearance of these variables equates to a decrease in quality) for the unknown sample. As in the first and second embodiments, the system can alert the user to the existence of this significant global difference and, optionally, respond in an appropriate manner to the indications input by the user—notably, by developing a new data processing model if it is considered that the global difference between the unknown sample and the training database arises from a natural variation in the analyzed product. A correctly-planned set of experiments for the training phase will usually enable the expected variability in the samples to be taken into account. The invention enables a rapid identification of defects which are not known a priori.

Figure 6B:
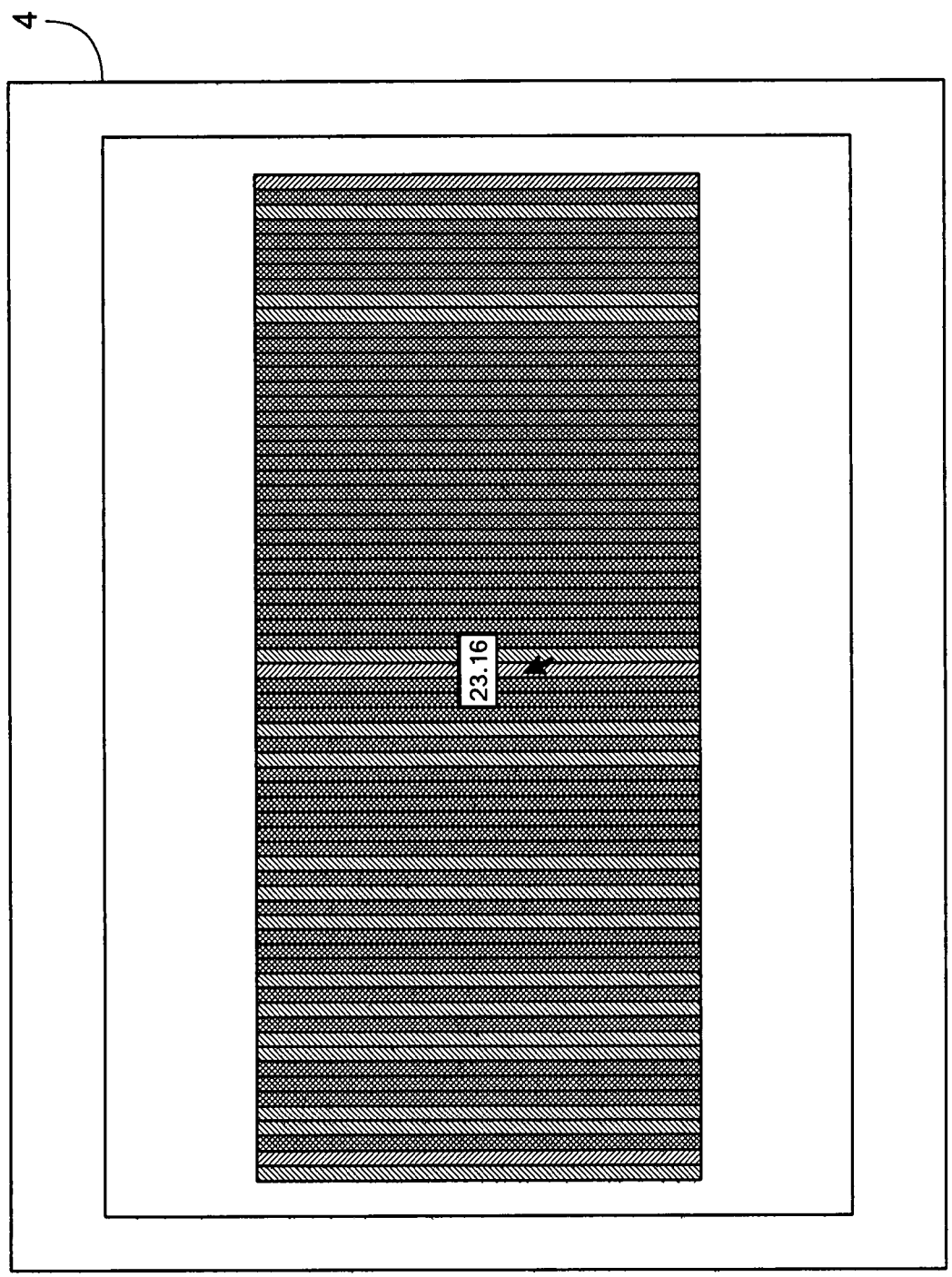

FIG. 6A shows how the proposed graphical representation could be represented on a display screen. The graphical representation could be displayed simply, without labels or axes, as can be seen in FIG. 6A. However, the graphical interface can be adapted so as to display other information in association with the simple graphical representation: for example, an axis labeled so as to indicate the parameter according to which the variables have been arranged in order, the names of the variables, etc. If desired, the display or non-display of this subsidiary information can follow some action by the user. For example, the graphical interface may first of all display the simple graphical representation of FIG. 6A then, if the user employs the computer mouse so as to position an on-screen cursor on the bar corresponding to a variable "retention time=23.16 seconds", and clicks a mouse button, the retention time corresponding to this variable will be displayed as can be seen in FIG. 6B.

The techniques described heretofore relate to parameters enabling a global comparison to be made of the unknown sample with respect to the training database. However, it may prove interesting to examine the differences and the similarities which arise in terms of individual variables. According to a fourth embodiment of the invention, a comparison is made between the value of a characteristic as measured for the unknown sample and the statistical distribution of values for this same characteristic as measured for the reference samples.

Figure 7:
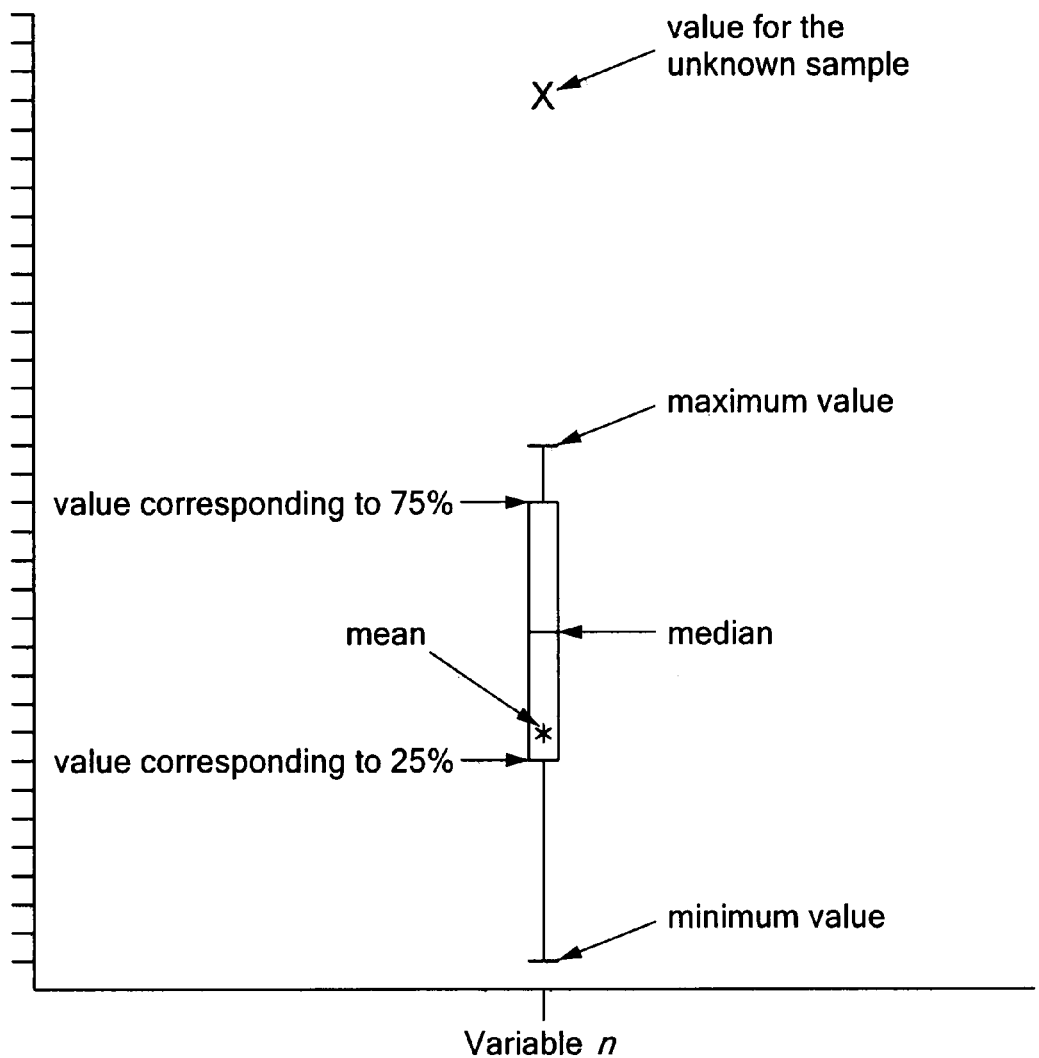
FIG. 7 is an annotated version of a graphical representation, produced according to a fourth embodiment of the present invention, for comparing the value taken by an individual variable for a sample under test with the set of values taken by this same variable for the reference samples.

The proposed approach for comparing the value measured for the unknown sample and the statistical distribution of values applicable to the training database consists in developing a box plot, preferably in the form of a box-and-whiskers plot. In 1977, Tukey proposed a box plot or box-and-whiskers plot for the representation of statistical distributions. FIG. 7 shows an example of a box-and-whiskers plot representation of measured values of a particular characteristic; this allows an explanation to be given of the correspondence between the various statistical measures and the illustrated shape.

In the example shown in FIG. 7, the bottom edge of the box coincides with the value corresponding to 25% of the reference samples—that is, this value of the variable in question is taken by at least 25% of the set of samples in the training database—and the upper edge of the box coincides with the value corresponding to 75% of the reference samples. A horizontal line near the center of the box indicates the median value and a star indicates the mean (average) value. If the representation in FIG. 7 corresponded to a simple box plot type of representation there would be no lines additional to those already mentioned. However, because this drawing shows a box-and-whiskers plot, there is also a vertical line starting from the upper edge of the box and extending upwards and a vertical line starting at the bottom edge of the box and extending downwards. The upper vertical line extends up to the maximum value that has been measured for the variable in question in relation to one of the reference samples, and the lower vertical line extends down to the minimum value.

A box plot, or a box-and-whiskers plot, can take various different configurations. For example, the upper and lower edges of the box can correspond to other percentile values and not to the quartiles, lines corresponding to values other than the median can be drawn across the box, the extremities of the "whiskers" can correspond to values corresponding to other percentiles (for example to 5% and 95%) instead of corresponding to the minimum and maximum values.

According to the fourth embodiment of the present invention an indication of the value of the variable in question, as measured for the unknown sample, is superimposed on a graphical representation in the form of a box-and-whiskers plot (or in the form of a box plot), the box-and-whiskers plot (or box plot) relating to the statistical distribution of the values measured for the reference samples in the training database. FIG. 7 illustrates an example of this approach and corresponds to the case where the value applicable to the unknown sample is markedly higher than the maximum value taken by the set of reference samples. A special case arises when new variables appear in relation to the unknown sample, which are not present for the reference samples.

Figure 8:
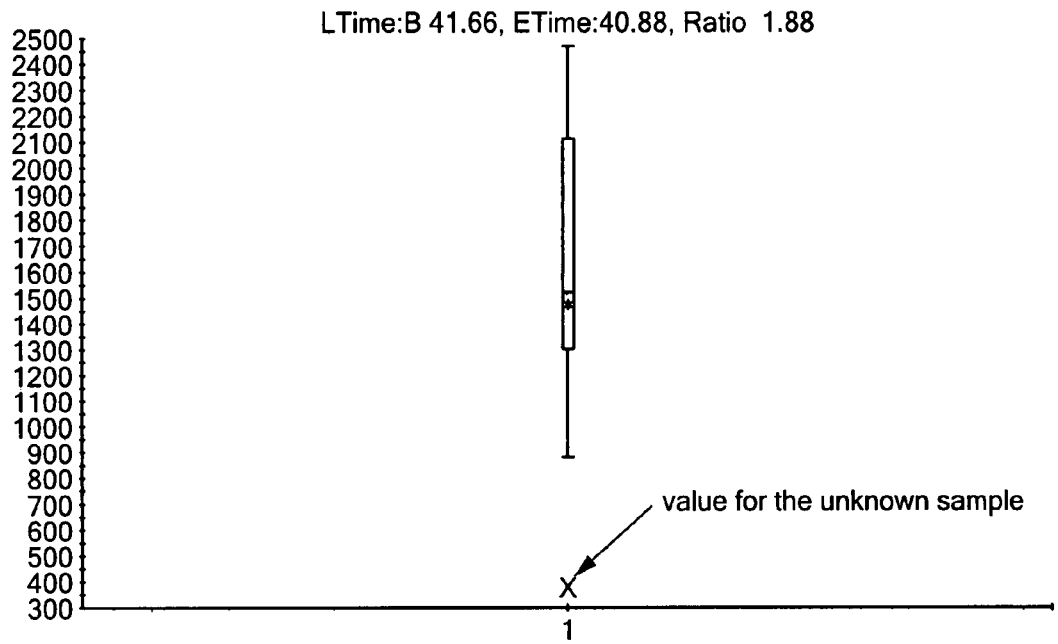
FIG. 8 is a graphical representation according to FIG. 7 relative to an example of a variable of a first class.

FIG. 8 illustrates an example of the opposite case, where the value applicable for the unknown sample is markedly lower than the minimum value taken by the set of reference samples. As can be seen from FIG. 8, information can be displayed in association with the box-and-whiskers plot type (or box plot type) graphical representation, either in an automated fashion or based on the user's actions. In FIG. 8 the displayed information is "L.Time:B.41.66"—that is, the retention time of the "library" (training database) with respect to the column B is 41.66 seconds—and "E.time: 40.88"—that is, the retention time for the unknown sample is 40.88 seconds.

For any variable one wishes, it is possible to determine the following coefficient C:

$$C = (X(\text{Unknown}) - \text{Mean}(\text{Library}))/(\text{Standard deviation}(\text{Library})),$$

Where X(Unknown) represents the value applicable to this variable as measured for the unknown sample, Mean(Library) represents the mean value of this variable as measured for the reference samples in the training database, and Standard deviation(Library) represents the standard deviation of the values of this variable as measured for the reference samples in the training database.

This coefficient C provides an indication as how far the unknown sample's measured value is from the mean of the training database values: the difference is significant if this coefficient is greater than 3. More particularly, if this coefficient is greater than 3 then the probability that the unknown sample relates to the same product as the samples in the training database is less than 0.002.

If new variables appear (that is, if the unknown sample has a measured value for one or more variables which do not apply to the training database) then this can trigger the identification of the origin of a defect. Similarly, alarms can be generated when the measured intensity of these new elements exceeds a set threshold level. The compound or component that is responsible for the new variable(s) can be identified using reference products.

Figure 9:
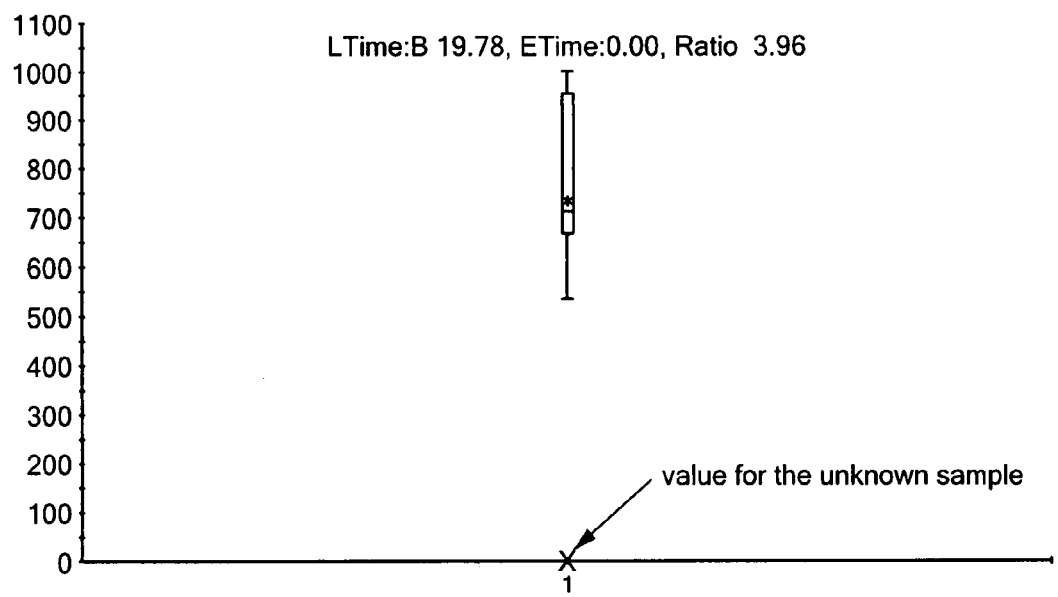
FIG. 9 is a graphical representation according to FIG. 7 relative to an example of a variable of a second class.

FIGS. 7 and 8 show diagrams relating to variables that are common to the unknown sample and to the training database, that is, variables in the first class (set $J_{intersection}$). However, the same type of diagram can be used for the variables of the second class (the set Own(Ja)) by displaying a nil value for the unknown sample (see FIG. 9). Furthermore, several box-and-whiskers plot (or box plot) diagrams can be displayed together: for example, diagrams relating to all the variables of the first class, or diagrams relating to all the variables of the first and second classes.

Figure 10:
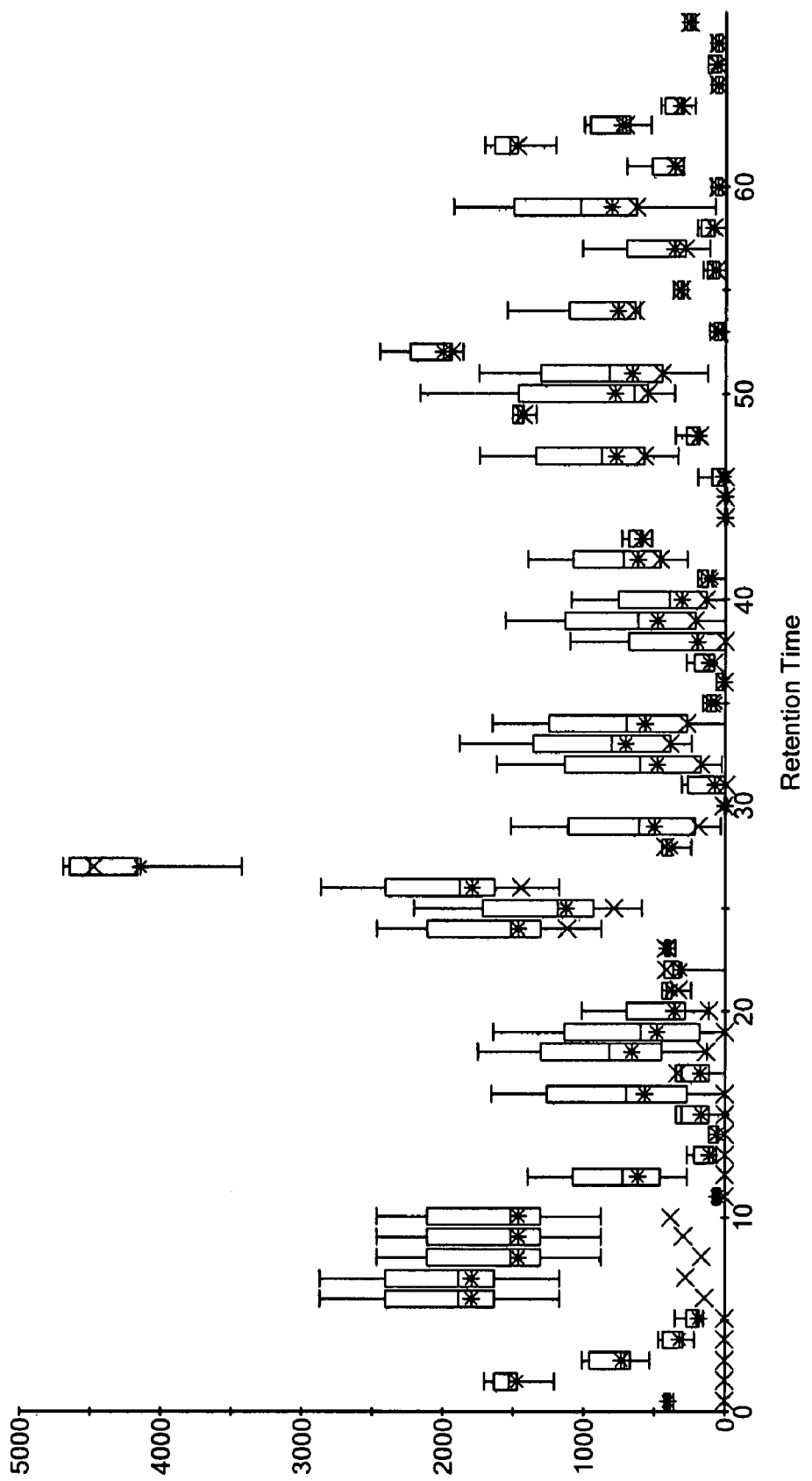
FIG. 10 is a graphical representation according to FIG. 7 relative to an example of a set of variables of the first and second classes.
Figure 11:
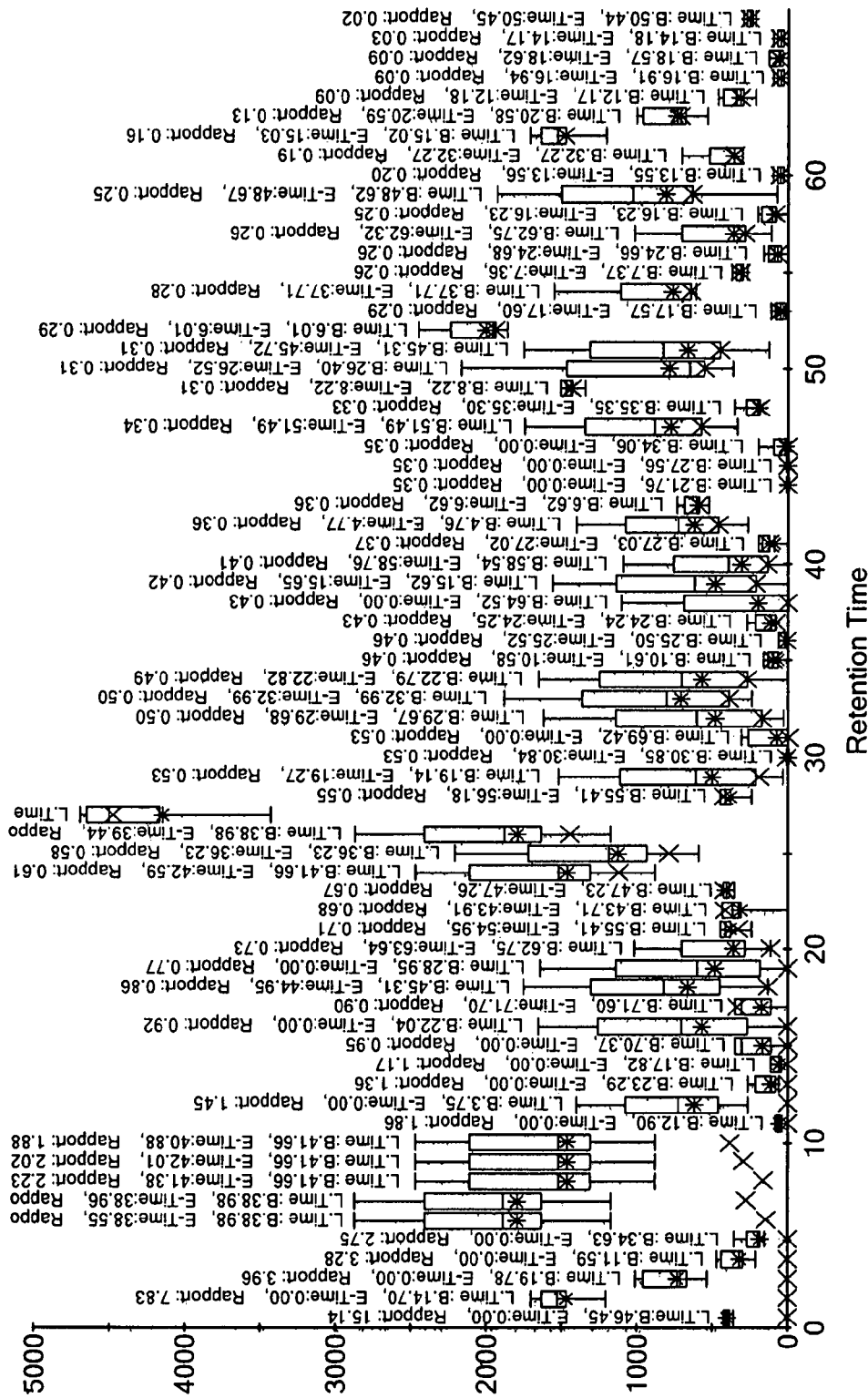
FIG. 11 is a graphical representation according to FIG. 10 enhanced with supplementary information.

FIGS. 10 and 11 show an example of the case where box-and-whiskers plot diagrams relating to all the variables of the first and second classes are displayed simultaneously; in FIG. 10 the data is shown without labeling whereas in FIG. 11 the diagrams are annotated, notably so as to indicate the values applicable to the different variables as measured for the library (the training database) and for the sample under test, as well as the above-mentioned coefficient C (designated "rapport" in FIG. 11). Once again, the system can be adapted so as to offer the user different options with regard to the information to be displayed as annotation and different events can trigger the displaying of the annotation (the user's actions, automatic display, etc.).

When box-and-whiskers plot diagrams are displayed simultaneously for variables of different classes ($1^{st}$ and $2^{nd}$ classes), the way in which the diagrams are illustrated can vary according to the class in question. For example, the diagrams (and/or the associated annotation labels) relating to the variables of the first class can be displayed in a first color and the diagrams relating to the variables of the second class can be displayed in a second color.

Although different embodiments of the invention have been described individually, it should be noted that a system according to the invention can implement a combination of two or more of the methods (or, even, all of the methods) described above in relation to the first through fourth embodiments. In the case where a single system implements a plurality of the methods of the first through fourth embodiments of the invention, the system can be designed so that the image data used to represent the variables (or to represent the values of the variables) of a particular class are displayed in the same color (or shading style, etc.) in all of the different types of graphical representation. This makes it easier to interpret the full set of graphical representations.

Although particular embodiments of the present invention have been described above, the skilled person will understand that various modifications and adaptations can be made in these embodiments without departing from the present invention.

More particularly, although annexed FIG. 3 shows a particular distribution of functions between different components of a system, the skilled person will understand that the functions can be distributed differently. Furthermore, depending on the way in which the system is implemented it may be impossible to identify individual modules which perform the described functions; certain of the modules shown in FIG. 3. can be combined. Moreover, the various modules shown in FIG. 3 do not necessarily correspond to physical hardware. The corresponding functions can (and, in general, will) be implemented using software.

What is claimed is:

1. A method of comparative analysis of a subject sample, derived from a product, with respect to a set of reference samples, comprising the steps of:
   a) measuring values of a plurality of characteristics of the reference samples;
   b) measuring values of a plurality of characteristics of the subject sample;
   wherein the measuring steps a) and b) implement an instrumental or sense-based analysis method producing values relating to a variable number of characteristics, said number depending on the analyzed product;
   c) determining the set of characteristics having values measured during the preceding steps;
   d) in the set of characteristics established in step c)
      i) identifying, as a first class of characteristics, the characteristics common to the subject sample and to at least one of the reference samples,
      ii) identifying, as a second class of characteristics, the characteristics particular to the reference samples, and
      iii) identifying, as a third class of characteristics, the characteristics particular to the subject sample;
   e) for each of the values measured in steps a) and b), producing an indication of the class assigned to the corresponding characteristic during step d) and associating this indication with the measured value;
   f) for the characteristics determined in step c), quantifying the ratio between, on the one hand:
      i) the measured values of the characteristics particular to the subject sample, and
      ii) the measured values of the characteristics particular to the reference samples, and, on the other hand, the values of all the characteristics determined in step c) as measured during steps a) and b); and
   g) when the magnitude of at least one of the ratios calculated in step f) exceeds a first predetermined threshold level, producing a warning signal indicative of a significant difference between the subject sample and the set of reference samples.

2. Comparative analysis method according to claim 1, wherein the ratio-quantifying step comprises:
   f) quantifying the ratio between, on the one hand:
      i) the measured values of the characteristics particular to the subject sample,
      ii) the measured values of the characteristics particular to the reference samples, iii) the values, measured for the subject sample, of the characteristics common to the subject sample and to at least one of the reference samples, iv) the values, measured for the reference samples, of the characteristics common to the subject sample and to at least one of the reference samples, and, on the other hand, the values of all the characteristics determined in step c) as measured during steps a) and b); and the comparative analysis method further comprises the step of:

h) for each of the ratios calculated in step f), generating image data defining a region whose area depends on the magnitude of said ratio, and displaying an image according to said image data, the manner of representing each region being different.

3. Comparative analysis method according to claim 1, further comprising:

j) in the characteristics determined in step c), quantifying the proportion constituted by the characteristics common to the subject sample and to at least one of the reference samples, the proportion constituted by the characteristics particular to the reference samples, and the proportion constituted by characteristics particular to the subject sample;

k) for each of the proportions quantified in step j), generating image data defining a region whose area depends on the magnitude of said portion; and l) displaying an image according to the image data generated in step k), the manner of representing each region being different.

4. Comparative analysis method according to claim 1, further comprising:

j) in the characteristics determined in step c), quantifying the proportion constituted by the characteristics common to the subject sample and to at least one of the reference samples, the proportion constituted by the characteristics particular to the reference samples, and the proportion constituted by characteristics particular to the subject sample; and m) producing a warning if the magnitude of at least one of the proportions calculated in step j) exceeds a second predetermined threshold level.

5. Comparative analysis method according to claim 1, further comprising:

j) in the characteristics determined in step c), quantifying the proportion constituted by the characteristics common to the subject sample and to at least one of the reference samples, the proportion constituted by the characteristics particular o the reference samples, and the proportion constituted by characteristics particular to the subject sample;

n) defining an order for organizing the characteristics determined in step c);

o) within the order defined in step n), determining the distribution, of: the characteristics common to the subject sample and to at least one of the reference samples, the characteristics particular to the reference samples and the characteristics particular to the subject sample; and p) analyzing the distribution determined in step o) so as to check whether a condition is fulfilled for the production of a warning.

6. Comparative analysis method according to claim 1, further comprising:

j) in the characteristics determined in step c), quantifying the proportion constituted by the characteristics common to the subject sample and to at least one of the reference samples, the proportion constituted by the characteristics particular to the reference samples, and the proportion constituted by characteristics particular to the subject sample;

n) defining an order for organizing the characteristics determined in step c);

q) generating first image data for the characteristics common to the subject sample and to at least one of the reference samples, generating second image data for the characteristics particular to the reference samples, and generating third image data for the characteristics particular to the subject sample; and r) displaying an image according to the first, second and third image data in a manner which localizes the image data relating to each characteristic, in the image plan, according to the positioning of this characteristic within the order defined in step n), the manner of representing each characteristic being different according to whether this characteristic corresponds to the first, second or third image data.

7. Comparative analysis method according to claim 6, and further comprising:

s) for at least one of the characteristics common to the subject sample and the reference samples, generating image data defining a box-and-whiskers plot based on the values of this characteristic as measured for the reference samples; and t) displaying a box-and-whiskers plot according to the image data generated in step s) and superimposing thereon image data relating to the value of said at least one characteristic as measured for the subject sample.

8. Comparative analysis method according to claim 7, and further comprising:

u) inputting selection data from a user;

wherein the characteristic or characteristics for which image data is generated in step s) and displayed in step t) consist(s) of characteristic(s) identified by the selection data input in step u).

9. Comparative analysis method according to claim 7, wherein image data relating to all the characteristics common to the subject sample and to at least one of the reference samples is generated in step s) and displayed together during step t).

10. Comparative analysis method of claim 7, wherein image data relating to all the characteristics particular to the reference samples is generated in step s) and displayed together during step t), and the image data displayed for the subject sample and superimposed on the image data relating to the characteristics particular to the reference samples is data indicating a nil value.

11. Comparative analysis method according to claim 7, and further comprising generating a warning if the value of a coefficient C exceeds a third threshold level, where:

$$C = (X(\text{Unknown}) - \text{Mean}(\text{Library}))/(\text{Standard Deviation (Library)}),$$

where X(Unknown) is the value of a characteristic as measured for the subject sample, Mean(Library) is the mean of the values of said characteristic as measured for the reference samples and Standard Deviation(Library) is the standard deviation of the values of said characteristic as measured for the reference samples.

12. Comparative analysis method according to claim 1, and further comprising:

v) inputting identification data from a user, said identification data indicating either than the subject sample for which a warning has been produced is defective or that said subject sample represents an allowable variation relative to the reference samples; and w) if the identification data input at step v) indicates that the subject sample represents an allowable variation, updating a data processing model so as to include said subject sample in the reference samples.

13. A computer program, recorded on a computer readable medium, having a set of instructions which, when run on a computer, make the computer perform the steps of the comparative analysis method of claim 1.

14. System of comparative analysis of a subject sample, derived from a product, with respect to a set of reference samples, said system comprising a computer programmed so as to perform the steps of the comparative analysis method defined in claim 1.

15. A method of comparative analysis of a subject sample, derived from a product, with respect to a set of reference samples, comprising:
   a) measuring the values of a plurality of characteristics of the reference samples;
   b) measuring the values of a plurality of characteristics of the subject sample;
   wherein the measuring steps a) and b) implement an instrumental or sense-based analysis method producing values relating to a variable number of characteristics, said number depending on the analyzed product;
   c) determining the set of characteristics having values measured during the preceding steps;
   d) in the set of characteristics established in step c)
      i) identifying, as a first class of characteristics, the characteristics common to the subject sample and to at least one of the reference samples,
      ii) identifying, as a second class of characteristics, the characteristics particular to the reference samples, and
      iii) identifying, as a third class of characteristics, the characteristics particular to the subject sample;
   e) for each of the values measured in steps a) and b), producing an indication of the class assigned to the corresponding characteristic during step d) and associating this indication with the measured value;
   j) in the characteristics determined in step c), quantifying the proportion constituted by the characteristics common to the subject sample and to at least one of the reference samples, the proportion constituted by the characteristics particular to the reference samples, and the proportion constituted by characteristics particular to the subject sample; and
   m) producing a warning indicative of a significant difference between the subject sample and the set of reference samples if the magnitude of at least one of the proportions calculated in step j) exceeds a predetermined threshold level.

16. A method of comparative analysis of a subject sample, derived from a product, with respect to a set of reference samples, comprising:
   a) measuring the values of a plurality of characteristics of the reference samples;
   b) measuring the values of a plurality of characteristics of the subject sample;
   wherein the measuring steps a) and b) implement an instrumental or sense-based analysis method producing values relating to a variable number of characteristics, said number depending on the analyzed product;
   c) determining the set of characteristics having values measured during the preceding steps;
   d) in the set of characteristics established in step c)
      i) identifying, as a first class of characteristics, the characteristics common to the subject sample and to at least one of the reference samples,
      ii) identifying, as a second class of characteristics, the characteristics particular to the reference samples, and
      iii) identifying, as a third class of characteristics, the characteristics particular to the subject sample;
   e) for each of the values measured in steps a) and b), producing an indication of the class assigned to the corresponding characteristic during step d) and associating this indication with the measured value;
   n) defining an order for organizing the characteristics determined in step c);
   o) within the order defined in step n), determining the distribution of: the characteristics common to the subject sample and to at least one of the reference samples, the characteristics particular to the reference samples, and the characteristics particular to the subject sample;
   p) analyzing the distribution determined in step o) so as to check whether a condition is fulfilled for the production of a warning; and
   x) if the analyzing step determines that said condition is fulfilled, generating a warning indicative of a significant difference between the subject sample and the reference samples.

17. A method of comparative analysis of a subject sample, derived from a product, with respect to a set of reference samples, comprising:
   a) measuring the values of a plurality of characteristics of the reference samples;
   b) measuring the values of a plurality of characteristics of the subject sample;
   wherein the measuring steps a) and b) implement an instrumental or sense-based analysis method producing values relating to a variable number of characteristics, said number depending on the analyzed product;
   c) determining the set of characteristics having values measured during the preceding steps;
   d) in the set of characteristics established in step c)
      i) identifying, as a first class of characteristics, the characteristics common to the subject sample and to at least one of the reference samples,
      ii) identifying, as a second class of characteristics,
   the characteristics particular to the reference samples, and
   iii) identifying, as a third class of characteristics,
   the characteristics particular to the subject sample;
   e) for each of the values measured in steps a) and b), producing an indication of the class assigned to the corresponding characteristic during step d) and associating this indication with the measured value; and
   y) generating a warning if the value of a coefficient C exceeds a third threshold level, where:

$$C = (X(\text{Unknown}) - \text{Mean (Library)}) / (\text{Standard Deviation (Library)}),$$

where X(Unknown) is the value of a characteristic as measured for the subject sample, Mean(Library) is the mean of the values of said characteristic as measured for the reference samples and Standard Deviation(Library) is the standard deviation of the values of said characteristic as measured for the reference samples.

18. A method of comparative analysis of a subject sample, derived from a product, with respect to a set of reference samples, comprising:
   a) measuring the values of a plurality of characteristics of the reference samples;

b) measuring the values of a plurality of characteristics of the subject sample;

wherein the measuring steps a) and b) implement an instrumental or sense-based analysis method producing values relating to a variable number of characteristics, said number depending on the analyzed product;

c) determining the set of characteristics having values measured during the preceding steps;

d) in the set of characteristics established in step c)
   i) identifying, as a first class of characteristics, the characteristics common to the subject sample and to at least one of the reference samples,
   ii) identifying, as a second class of characteristics, the characteristics particular to the reference samples, and
   iii) identifying, as a third class of characteristics, the characteristics particular to the subject sample;

e) for each of the values measured in steps a) and b), producing an indication of the class assigned to the corresponding characteristic during step d) and associating this indication with the measured value;

f) for the characteristics determined in step c), quantifying the ratio between, on the one hand:
   i) the values, measured for the subject sample, of the characteristics common to the subject sample and to at least one of the reference samples,
   ii) the measured values of the characteristics particular to the subject sample,
   iii) the values, measured for the reference samples, of the characteristics common to the subject sample and to at least one of the reference samples,
   iv) the measured values of the characteristics particular to the reference samples, and, on the other hand, the values of all the characteristics determined in step c) as measured in steps a) and b); and g) for each of the ratios calculated in step f), generating image data defining a region whose area depends on the magnitude of said ratio, the manner of representing each region being different.

19. A method of comparative analysis of a subject sample, derived from a product, with respect to a set of reference samples, comprising:

a) measuring the values of a plurality of characteristics of the reference samples;

b) measuring the values of a plurality of characteristics of the subject sample;

wherein the measuring steps a) and b) implement an instrumental or sense-based analysis method producing values relating to a variable number of characteristics, said number depending on the analyzed product;

c) determining the set of characteristics having values measured during the preceding steps;

d) in the set of characteristics established in step c)
   i) identifying, as a first class of characteristics, the characteristics common to the subject sample and to at least one of the reference samples,
   ii) identifying, as a second class of characteristics, the characteristics particular to the reference samples, and
   iii) identifying, as a third class of characteristics, the characteristics particular to the subject sample;

e) for each of the values measured in steps a) and b), producing an indication of the class assigned to the corresponding characteristic during step d) and associating this indication with the measured value;

j) in the characteristics determined in step c), quantifying the proportion constituted by the characteristics common to the subject sample and to at least one of the reference samples, the proportion constituted by the characteristics particular to the reference samples, and the proportion constituted by characteristics particular to the subject sample;

k) for each of the proportions quantified in step j), generating image data defining a region whose area depends on the magnitude of said portion; and l) displaying an image according to the image data generated in step k), the manner of representing each region being different.

20. A method of comparative analysis of a subject sample, derived from a product, with respect to a set of reference samples, comprising:

a) measuring the values of a plurality of characteristics of the reference samples;

b) measuring the values of a plurality of characteristics of the subject sample;

wherein the measuring steps a) and b) implement an instrumental or sense-based analysis method producing values relating to a variable number of characteristics, said number depending on the analyzed product;

c) determining the set of characteristics having values measured during the preceding steps;

d) in the set of characteristics established in step c)
   i) identifying, as a first class of characteristics, the characteristics common to the subject sample and to at least one of the reference samples,
   ii) identifying, as a second class of characteristics, the characteristics particular to the reference samples, and
   iii) identifying, as a third class of characteristics, the characteristics particular to the subject sample;

e) for each of the values measured in steps a) and b), producing an indication of the class assigned to the corresponding characteristic during step d) and associating this indication with the measured value;

n) defining an order for organizing the characteristics determined in step c);

q) generating first image data for the characteristics common to the subject sample and to at least one of the reference samples, generating second image data for the characteristics particular to the reference samples, and generating third image data for the characteristics particular to the subject sample; and r) displaying an image according to the first, second and third image data in a manner which localizes the image data relating to each characteristic, in the image plan, according to the positioning of this characteristic within the order defined in step n), the manner of representing each characteristic being different according to whether this characteristic corresponds to the first, second or third image data.

* * * * *

UNITED STATES PATENT AND TRADEMARK OFFICE
CERTIFICATE OF CORRECTION

PATENT NO. : 7,734,436 B2  
APPLICATION NO. : 11/786455  
DATED : June 8, 2010  
INVENTOR(S) : Said Labreche Page 1 of 1

It is certified that error appears in the above-identified patent and that said Letters Patent is hereby corrected as shown below:

Column 5, line 37, reads as follows:

" $X(i,j) = V^i(ei)$, with $i = 1:n$ and $j=1:p$ "

Should read as:

-- $X(i,j) = V^j(ei)$, with $i = 1:n$ and $j=1:p$ --; and

Column 6, line 6, reads as follows:

" $Own(J_a) = \{V^j, V^j \in Ja, \text{ for all } Vu^k \in Ju \text{ where } V^j \neq Vu^k\}$ "

Should read as:

-- $Own(J_a) = \{V^j, V^j \in Ja, \text{ for all } Vu^k \in Ju \text{ where } V^j \neq Vu^j\}$ --.

Signed and Sealed this  
Second Day of October, 2012

David J. Kappos  
*Director of the United States Patent and Trademark Office*